(12) United States Patent
Garcia

(10) Patent No.: US 6,688,061 B2
(45) Date of Patent: Feb. 10, 2004

(54) DIRECT LAMINATED FLOOR

(75) Inventor: Eugenio Cruz Garcia, Gandia (ES)

(73) Assignee: Industrias Auxiliares Faus, S.L., Gandia (ES)

( * ) Notice: Subject to any disclaimer, the term of this patent is extended or adjusted under 35 U.S.C. 154(b) by 0 days.

(21) Appl. No.: 10/127,602

(22) Filed: Apr. 23, 2002

(65) Prior Publication Data

US 2002/0110669 A1 Aug. 15, 2002

Related U.S. Application Data

(63) Continuation of application No. 09/460,117, filed on Dec. 13, 1999, now Pat. No. 6,401,415.

(30) Foreign Application Priority Data

Nov. 5, 1999 (ES) ................................. 9902432

(51) Int. Cl.[7] ............................................. E04F 15/00
(52) U.S. Cl. .......................... 52/311.1; 52/313; 52/315; 52/316; 52/392
(58) Field of Search .................... 52/314, 316, 313, 52/315, 392, 311.1; 428/15, 33, 50, 83, 542.2

(56) References Cited

U.S. PATENT DOCUMENTS

| | | | |
|---|---|---|---|
| 2,108,226 A | | 2/1938 | Johnston |
| 3,373,068 A | | 3/1968 | Grosheim et al. |
| 3,878,030 A | * | 4/1975 | Cook ........................... 428/45 |
| 4,290,248 A | * | 9/1981 | Kemerer et al. .......... 52/314 X |
| 4,864,790 A | * | 9/1989 | Liardet ...................... 52/316 X |
| 5,226,273 A | * | 7/1993 | Burke .......................... 52/390 |
| 5,314,554 A | * | 5/1994 | Owens ........................ 156/154 |
| 5,713,173 A | * | 2/1998 | Von Langsdorff et al. ........................ 52/316 X |
| 5,736,227 A | * | 4/1998 | Sweet et al. ................ 428/192 |
| 5,858,160 A | | 1/1999 | Piacente et al. |
| 5,961,903 A | | 10/1999 | Eby et al. |
| 6,114,008 A | | 9/2000 | Eby et al. |

FOREIGN PATENT DOCUMENTS

| | | |
|---|---|---|
| EP | 1 153 736 A1 | 11/2001 |
| EP | 0 888 215 B1 | 6/2002 |
| EP | 1 225 033 A1 | 7/2002 |
| EP | 0 883 487 B1 | 10/2002 |
| ES | 163421 U | 5/1971 |
| ES | 460194 A | 5/1978 |
| ES | 283331 U | 5/1985 |
| ES | 1019585 U | 4/1992 |
| WO | WO-97/31776 A1 | 9/1997 |

* cited by examiner

*Primary Examiner*—Carl D. Friedman
*Assistant Examiner*—Jennifer I. Thissell
(74) *Attorney, Agent, or Firm*—McKenna Long & Aldridge LLP

(57) ABSTRACT

New direct laminated floor, of the kind that contain, on their surface, cellulose sheets impregnated in polymerizable resins, on which some characteristics have been drawn and where, once pressed and mechanized, the finished strips have an offset/sunk area on the peripheral edge and the optic/tactile texture of the surface corresponds and adapts to the characteristics drawn on the cellulose sheets.

For application in the construction industry.

14 Claims, 1 Drawing Sheet

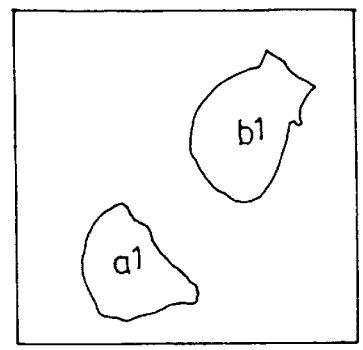
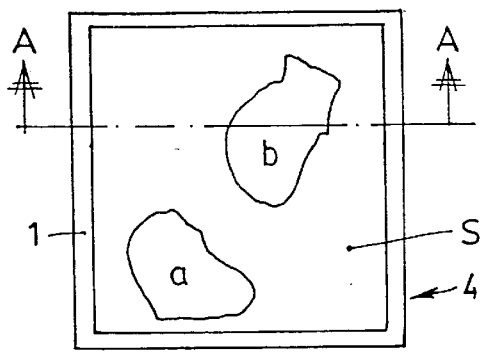
Fig. 2    Fig. 1
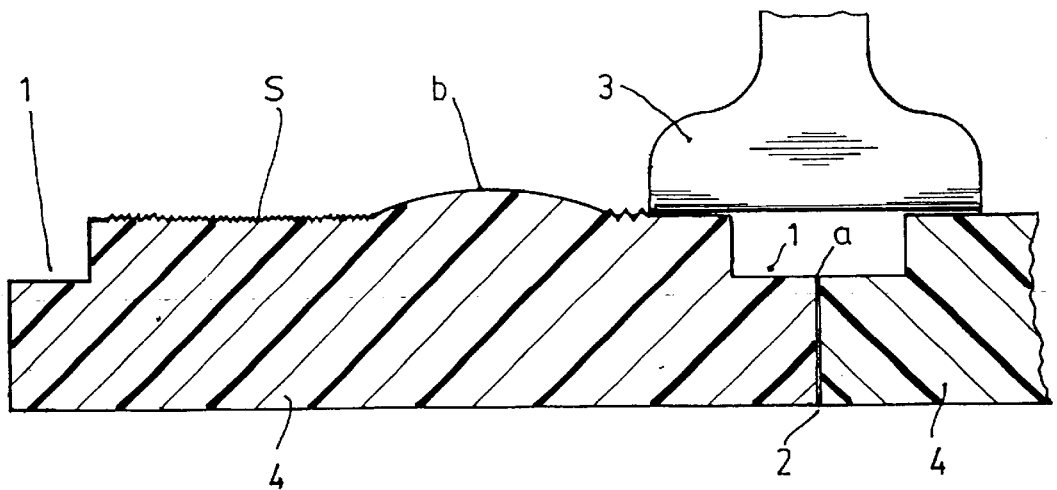
Fig. 3

DIRECT LAMINATED FLOOR

This application is a continuation of Ser. No. 09/460,117 Filed Dec. 13, 1999 now U.S. Pat. No. 6,401,415 patented Jun. 11, 2002.

Well known for some time has been the use of cellulose sheets (papers) impregnated in phenol or melamine resins and others, which, together with wooden boards or panels, plus some other components to be defined by each manufacturer, are hot pressed and give rise to already known products, such as boards, laminated boards, panels, direct laminated floors, etc. all of which are intended to imitate wooden, ceramic, natural stone coverings, etc. mainly for floors.

If melamine has been used and the product is going to have a single work surface (for example for floors), the melaminised board, that comes from the press with a surface area that generally varies between 3 and 8 square meters, is mechanised, that is, it is cut into pieces (strips) of approximately 1,200×200 mm. Each piece is tongued and grooved and is then ready for installation, achieving decorative and resistant paving, which imitates wooden, ceramic or natural stone paving.

This product has two defects:
1.—It is not resistant to wear.
2.—A good imitation of the natural product (ceramic, wood, etc.) it attempts to imitate is not achieved.

The applicant has investigated into the reason why parts, that is, tiles, strips, boards, thus manufactured and used as paving are not very resistant to wear. It has been seen that premature ageing begins around the edges of the perimeter of these parts, along the tongued and grooved line of the parts.

The products known to date have an even surface texture, so the user, the pedestrian, treads equally (the sole of his shoe makes contact) on the centre of a tile as on the edge, and as this perimetral edge is, due to its actual structure, the weakest area, that area is the one that deteriorates first.

One object of the invention is to overcome this problem on deciding that the product (tile, strip, board, etc.), which has a polygonal shape, normally a rectangle or square, should have bas-relief around the perimeter, that is, the edge contour should be a few tenths of a millimeter deeper than the rest of the product surface, so when the user treads, for example, on the tile, the sole does not rest on the perimeter edge, which has no contact under the sole. Likewise the friction or wear with any other agent that is normally in contact with the paving is avoided.

The applicant has also investigated into the reason for the second defect. He has reached the conclusion that if the imitation is not suitable, this is due to its surface texture, both under the optic viewpoint and tactile viewpoint, having an erroneous design.

In the current product, the decorative effect of the surface is achieved with the design which is printed on the impregnated paper, and with the texture of the surface which, whatever the product to be imitated, is a monotonous texture that covers the whole surface and which the press mould confers upon it.

The design represents the different identification characteristics (line, colour) of the natural product which, in the natural product, have different relief, but the texture (relief) provided by the press mould, is distributed equally over the whole surface. So in the product known today, in the typical areas, which, in the natural product, have differences in level, both at sight and to the touch, this does not occur.

Another object of this invention is to overcome this problem providing the product (tile, strip, board, etc.) with a surface that is not even or monotonous, but whose texture-relief corresponds and adapts to the areas of the design printed on the papers and defined as identification characteristics of the natural product.

That is, if wood knots appear in the design, for example, in the final product adapted to this design a highlighted area appears (with volumetric, conceptual, physical correspondence) which, at sight and on touch, is like a knot. The same happens if there is a pore in the wood, the roughness of the natural stone, or the surface bubbles of ceramics, etc.

This is achieved with an exact correspondence-concordance between the image of the impregnated papers and the relief-texture of the press mould.

Thus we obtain, for example:
- a).—Designs of ceramic tiles, where the unions between tiles are in bas-relief as occurs in paving made with earthenware ceramics;
- b).—Wood designs where the streaks; pores, knots, etc. that the paper design has are made by making them coincide with those of the surface texture.

In short, the novelty consists in a product with a very marked surface texture and which adapts and corresponds to the design provided by the paper, achieving a much more real effect than when the surface texture is not defined and adapted to the paper design. Not only is an optic effect produced, but the different relief's appear in the right area and can also be touched.

On the other hand we considerably increase the life of the product as the joints do not undergo wear as they are free from contact when being trod upon.

This invention advocates a new direct laminated floor, of the kind that includes cellulose sheets impregnated in polymerisable resins on its surface, on which some characteristics have been designed, and of the kind that, once pressed, the finished strips have an offset/sunk area in its peripheral edge.

It is also characterised because the optic/tactile texture of the surface of the floor, once pressed, corresponds and adapts to the characteristics designed on the cellulose sheets.

In order to understand the object of this invention better, a preferential way of practical execution is illustrated on the drawings, which is subject to accessory changes that take nothing away from its bases.

FIG. 1 is a plant view of the presence of a design on the resin-impregnated papers of the product before being pressed.

FIG. 2 is a plant view of the board products resulting from pressing the product of FIG. 1.

FIG. 3 is an illustration according to A:A cross-section of FIG. 2.

An example of a practical execution of this invention, but not a limiting one, is described below.

This type of product usually has cellulose cores impregnated in polymerisable resins such as phenols and in this case, impregnated in melamine. The core may also have wooden sheets or other product, such as silica to resist abrasion.

The chemical and multi-layer nature of the product is not the object of the invention.

A perimetral rim has been illustrated on the drawing (FIG. 1) which may even be in a different colour to the rest. This rim of the design will give rise to the perimetral offset in the pressing (1) (FIG. 2).

The unit (4) to be placed on the paving (FIG. 2) has a perimetral rim (1) that is sunk respect to the rest of the surface (s) of the board and which corresponds to the joint (2) areas or connection by whatever procedure, for example, tongue and groove with the enclosed unit(s).

The (mechanised) cutting or quartering of the first board coming from the press, can be done by units (strips), for example of 300×300 mm or 400×400 mm or 600×600 mm, or maintaining several units joined together in blocks, for example 1,200×300 mm (four) or 1,200×400 mm (three).

In this case the board attempts to imitate ceramics so two deformities (a) (b) have been illustrated, which are normal in surfaces of this material.

Bearing in mind that the ceramic tiles are usually butt joined with a small layer of cement, it will be seen that the perimetral rim (1) successfully imitates it both to touch and visually, due to its offset and possible cement colour which comes the design of the cellulose papers.

If the user treads between tiles (4) the sole (3) of his shoe never reaches the edge (a) of the tile (4).

It can be seen that once the characteristics ($a_1$), ($b_1$) of the product to be imitated (ceramic) have been defined in the drawing (FIG. 1), the volume-relief-texture (n this case deformities) in the end product (a), (b) (FIG. 2) correspond perfectly, respect to the position, concept, physical aspect, volume, etc. to these drawn characteristics ($a_1$), ($b_1$) identifying the product to be imitated.

In the specific case of the perimetral rim (1) a specific characteristic, for example, of the ceramic tiles, can be considered.

The mechanising of the product (flooring) that comes from the press usually consists in it being divided into units (strips) to be placed on the floor and in providing the strips (if necessary) with connection means, for example, tongue and groove.

This mechanising is not the object of the invention.

What is claimed is:

1. A laminated material comprising cellulose sheets impregnated with a polymer resin that are mechanically pressed and cut into a product, wherein the product includes a surface with both a perimeter area having an edge contour and an interior region, wherein the perimeter area is relieved such that the edge contour is below the interior region, wherein the surface is mechanically formed with a surface texture that varies in accordance with the visual pattern, and wherein the surface is formed from a cellulose sheet having a visual pattern that imitates another product.

2. A laminated material according to claim 1, wherein the surface is polygon shaped.

3. A laminated material according to claim 1, wherein the surface is rectangular.

4. A laminated material according to claim 1, wherein the surface is square.

5. A laminated material according to claim 1, wherein the surface is mechanically formed with a surface texture that varies in accordance with the visual pattern.

6. A laminated material according to claim 1, wherein the surface visually depicts wood.

7. A laminated material according to claim 1, wherein the surface visually depicts ceramic.

8. A laminated material according to claim 1, wherein the surface visually depicts stone.

9. A laminated material according to claim 1, wherein the product is a board.

10. A laminated material according to claim 1, wherein the product is a floorboard.

11. A laminated material according to claim 1, wherein the product is a wall panel.

12. A laminated material according to claim 1, wherein the product includes sidewalls that extend down from said edge contours to a rim.

13. A laminated material according to claim 12, wherein the rim is formed by mechanical pressing.

14. A laminated material according to claim 13, wherein the rim mates with another laminated material product.

* * * * *

US006688061C1

(12) INTER PARTES REEXAMINATION CERTIFICATE (1138th)
United States Patent
Garcia

(10) Number: US 6,688,061 C1
(45) Certificate Issued: Jul. 10, 2015

(54) DIRECT LAMINATED FLOOR

(75) Inventor: Eugenio Cruz Garcia, Gandia (ES)

(73) Assignees: BANCO BILBAO VIZCAYA ARGENTARIA, S.A., Bilbao (ES); CAJA DE AHORROS DE GALICIA, La Coruna (ES); BANKINTER, S.A., Madrid (ES); CAJA DE AHORROS DEL MEDITERRANEO, Alicante (ES); BANCO DE SABADELL, S.A., Sabadell (Barcelona) (ES); INSTITUTO VALENCIANO DE FINANZAS, Valencia (ES); BANCO DE VALENCIA, S.A., Valencia (ES); BANCO SANTANDER, S.A., Santander (ES)

Reexamination Request:
No. 95/001,516, Dec. 23, 2010

Reexamination Certificate for:
Patent No.: 6,688,061
Issued: Feb. 10, 2004
Appl. No.: 10/127,602
Filed: Apr. 23, 2002

Related U.S. Application Data

(63) Continuation of application No. 09/460,117, filed on Dec. 13, 1999, now Pat. No. 6,401,415.

(30) Foreign Application Priority Data

Nov. 5, 1999 (ES) .................................... 9902432

(51) Int. Cl.
*E04F 15/00* (2006.01)
*B32B 23/02* (2006.01)
*B44C 5/04* (2006.01)

(52) U.S. Cl.
CPC ............... *B32B 23/02* (2013.01); *B44C 5/0438* (2013.01)

(58) Field of Classification Search
None
See application file for complete search history.

(56) References Cited

To view the complete listing of prior art documents cited during the proceeding for Reexamination Control Number 95/001,516, please refer to the USPTO's public Patent Application Information Retrieval (PAIR) system under the Display References tab.

*Primary Examiner* — Jeffrey R Jastrzab

(57) ABSTRACT

New direct laminated floor, of the kind that contain, on their surface, cellulose sheets impregnated in polymerizable resins, on which some characteristics have been drawn and where, once pressed and mechanized, the finished strips have an offset/sunk area on the peripheral edge and the optic/tactile texture of the surface corresponds and adapts to the characteristics drawn on the cellulose sheets.

For application in the construction industry.

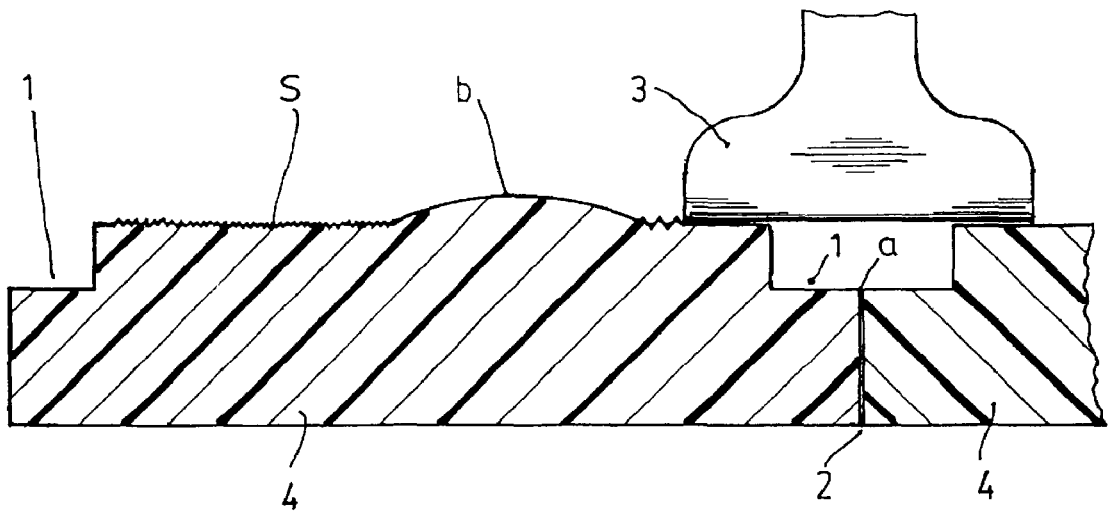

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*